United States Patent
Muraishi et al.

(10) Patent No.: US 9,444,954 B2
(45) Date of Patent: Sep. 13, 2016

(54) DISPLAYING SCANNED DATA IN DIFFERENT MODES DEPENDENT UPON SCANNED DATA INCLUDING BLANK PAGES

(71) Applicant: CANON KABUSHIKI KAISHA, Tokyo (JP)

(72) Inventors: Masaaki Muraishi, Musashino (JP); Yasuyuki Nakamura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/311,057

(22) Filed: Jun. 20, 2014

(65) Prior Publication Data

US 2014/0376022 A1 Dec. 25, 2014

(30) Foreign Application Priority Data

Jun. 24, 2013 (JP) .................. 2013-131666

(51) Int. Cl.
*G06F 3/12* (2006.01)
*H04N 1/00* (2006.01)

(52) U.S. Cl.
CPC ...... *H04N 1/00411* (2013.01); *H04N 1/00448* (2013.01); *H04N 1/00456* (2013.01); *H04N 1/00461* (2013.01); *H04N 1/00803* (2013.01)

(58) Field of Classification Search
CPC ........... H04N 1/0044; H04N 1/00442; H04N 1/00445; H04N 1/00448; H04N 1/0045; H04N 1/00453; H04N 1/00456; H04N 1/00458; H04N 1/00461; G06F 3/1256; G06F 3/1208
USPC .......................................... 358/1.15; 715/274
See application file for complete search history.

(56) References Cited

U.S. PATENT DOCUMENTS

| | | | |
|---|---|---|---|
| 6,473,539 B1* | 10/2002 | Koga ............................. | 382/317 |
| 2011/0228348 A1* | 9/2011 | Muraishi ...................... | 358/448 |
| 2012/0026519 A1* | 2/2012 | Yoshida ...................... | 358/1.11 |
| 2012/0147406 A1* | 6/2012 | Yamaneki et al. .......... | 358/1.13 |

FOREIGN PATENT DOCUMENTS

JP 2010-056803 A 3/2010

* cited by examiner

*Primary Examiner* — Eric A Rust
(74) *Attorney, Agent, or Firm* — Canon U.S.A., Inc. IP Division

(57) ABSTRACT

An image processing apparatus includes a determining unit that determines a possibility that image data is determined to contain specific information and a display control unit that determines a display mode of a preview image of the image data in accordance with the level of the possibility determined by the determining unit.

11 Claims, 11 Drawing Sheets

FIG. 6A

| ORIGINAL | BLANK SHEET DETERMINATION RESULT | | | DISPLAY MODE | | | |
|---|---|---|---|---|---|---|---|
| | BLANK SHEET DETERMINATION LEVEL 1 | BLANK SHEET DETERMINATION LEVEL 2 | BLANK SHEET DETERMINATION LEVEL 3 | No. | CHANGE DISPLAY SIZE | CHANGE BLINKING SPEED | CHANGE BRIGHTNESS |
| (a) | 0 | 0 | 0 | 1 | | | |
| (b) | 0 | 0 | 1 | 2 | | | |
| (c) | 0 | 1 | 1 | 3 | | | |
| (d) | 1 | 1 | 1 | 4 | | | |

FIG. 6B

| ORIGINAL | BLANK SHEET DETERMINATION RESULT | | | DISPLAY MODE |
|---|---|---|---|---|
| | BLANK SHEET DETERMINATION LEVEL 1 | BLANK SHEET DETERMINATION LEVEL 2 | BLANK SHEET DETERMINATION LEVEL 3 | |
| (a) | 0 | 0 | 0 | |
| (b) | 0 | 0 | 1 | |
| (c) | 0 | 1 | 1 | |
| (d) | 1 | 1 | 1 | |

DISPLAYING SCANNED DATA IN DIFFERENT MODES DEPENDENT UPON SCANNED DATA INCLUDING BLANK PAGES

BACKGROUND

1. Field

Aspects of the present invention generally relate to an image processing apparatus that determines whether image data to be processed does or does not contain printing information.

2. Description of the Related Art

There is a method of acquiring image data by having the position of an optical system fixed and scanning an original while conveying the original by means of an auto document feeder (ADF), when scanning the original with an image scanning apparatus such as a digital copier.

A multifunction peripheral equipped with an auto document scanning apparatus in the related art performs scanning on both sides of a sheet of paper even when an original printed on both sides of a sheet of paper and an original printed only on one side of a sheet of paper are mixed.

With this method, however, a blank sheet side that is the back side of the original printed only on one side of the sheet of paper is scanned as well. The blank sheet with no printing information is scanned as a result, processing unnecessary data. This results in wasting paper and electricity. In consideration of this issue, there is provided a blank sheet skip function which determines whether a scanned original is a blank sheet containing no printing information and deletes image data acquired by scanning the original that is determined to be a blank sheet.

The image data acquired from the original that is determined to be a blank sheet is deleted when the image data acquired with the use of the blank sheet skip function is output. In order to check in advance whether the blank sheet determination made by the blank sheet skip function is accurate, a user checks the image data that is determined to be acquired from the blank sheet of the original before outputting the image data.

Proposed in Japanese Patent Application Laid-Open No. 2010-056803 is an image processing apparatus that can display a preview by switching whether or not to display a preview image of the image data acquired by scanning the blank sheet of the original in order to check the image data acquired by scanning the blank sheet of the original.

With the invention described in Japanese Patent Application Laid-Open No. 2010-056803, however, one cannot see which original is detected to be the blank sheet when the preview image of the image data acquired from the original that is determined to be the blank sheet is not displayed in the preview. It is also difficult to check on which page of the entirely scanned original the original detected to be the blank sheet is located. That is, a user has been required to check which image data is not displayed in the preview while switching the preview image of the image data between a display mode and a non-display mode on a window, the image data being acquired by scanning the original that is determined to be the blank sheet.

SUMMARY

Aspects of the present invention generally provide a preview display method that improves legibility helping a user to find where in the entirely scanned original the image data is located, the image data being acquired by scanning the original determined to be a blank sheet.

An image processing apparatus according to an aspect of the present invention includes a determining unit that determines a possibility that image data is determined to contain printing information, and a display control unit that determines a display mode of a preview image of the image data in accordance with the level of the possibility determined by the determining unit.

According to aspects of the present invention, a user can more easily recognize where in the whole scanned original the original determined to be the blank sheet is located, thereby making it easier to output (print out, save, or transmit) only the image data corresponding to an original required by the user.

Further features of the present disclosure will become apparent from the following description of exemplary embodiments (with reference to the attached drawings).

BRIEF DESCRIPTION OF THE DRAWINGS

FIGS. 6A and 6B are diagrams, each of which illustrates an example of a display mode corresponding to a blank sheet determination result according to the first embodiment.

DESCRIPTION OF THE EMBODIMENTS

Exemplary embodiments will now be described with reference to the drawings.

Image data not containing printing information (image data acquired by scanning a blank sheet of an original) will be described below as an example of specific image data. Image data from which a feature such as color or a specific image, character, shape, and size can be detected can also be treated as the specific image data.

(First Embodiment)

Figure 1:
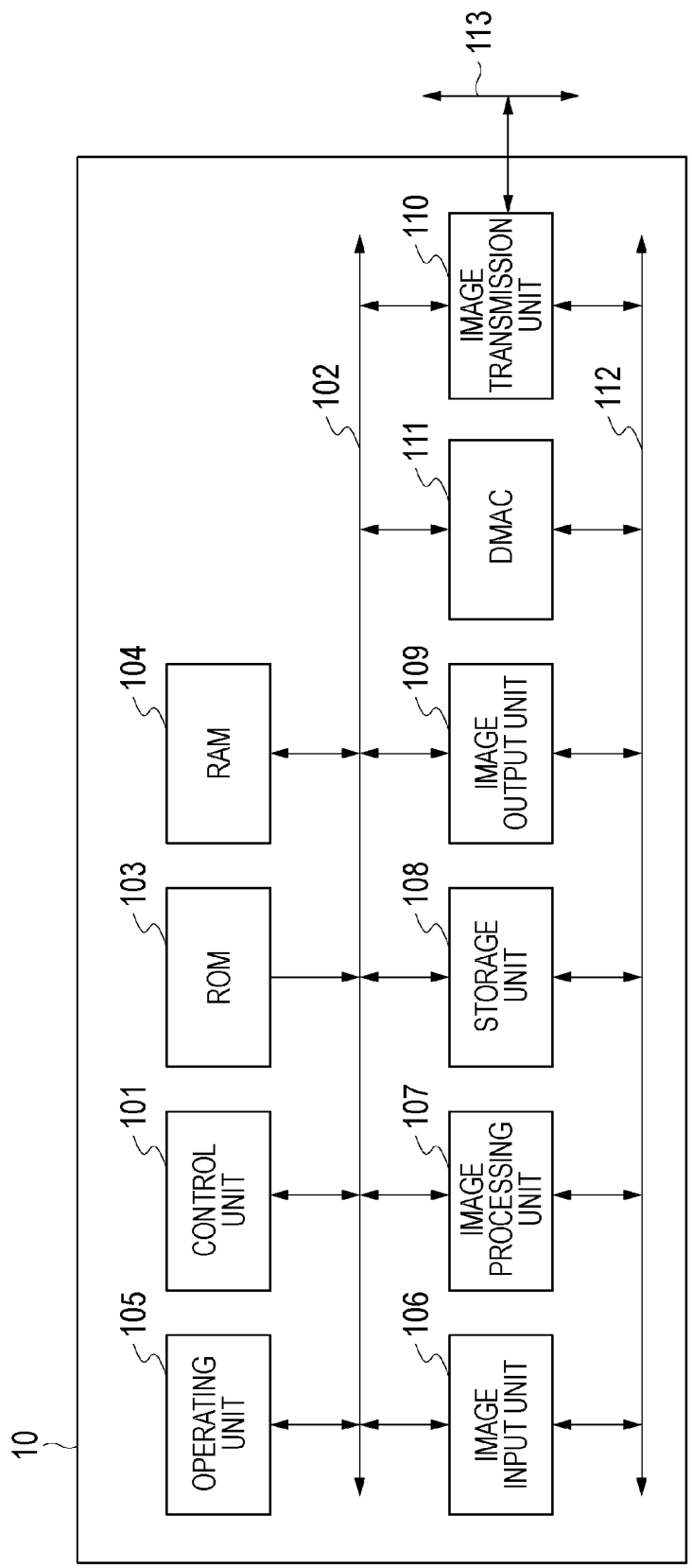
FIG. 1 is a block diagram illustrating an example of the configuration of an image processing apparatus according to a first embodiment.

FIG. 1 is a block diagram illustrating an example of the configuration of an image processing apparatus 10 as an example of a display control apparatus according to the present embodiment. A control unit 101 controls the entire apparatus and consists of a CPU (Central Processing Unit) or the like. A control bus 102 connects the control unit 101 and each block. A ROM (Read Only Memory) 103 stores a program executed by the control unit 101. A RAM (Random Access Memory) 104 is used as a temporary storage of control data or as a work memory by the control unit 101 performing control. An operating unit 105 is formed of a display such as a liquid crystal display (LCD) and a position input unit such as a touch pad, an action on which is instructed by a user, for example. An image input unit 106 scans image data of an original. An image processing unit 107 performs image processing on the image data scanned by the image input unit 106. A storage unit 108 stores input/output data of the image input unit 106 or the image processing unit 107.

The storage unit includes a hard disk drive (HDD), a solid state drive (SSD), a DDR-DDR (Double Data Rate Synchronous Dynamic Random Access Memory), and the like. An image output unit 109 prints out the image data processed by the image processing unit 107. An image transmission unit 110 transmits the image data of the original scanned by the image input unit 106, the image data processed by the image processing unit 107, or image data stored in the storage unit 108. A DMAC (Direct Memory Access Controller) 111 controls data transfer among the image input unit 106, the image processing unit 107, the storage unit 108, the image output unit 109, and the image transmission unit 110 under control of the control unit 101. A reference numeral 112 performs data transfer under control of the DMAC 111. A communication network 113 is an external communication network (LAN: Local Area Network or the like) connected to the image transmission unit 110.

<Configuration of Image Input Unit 106>

Figure 2:
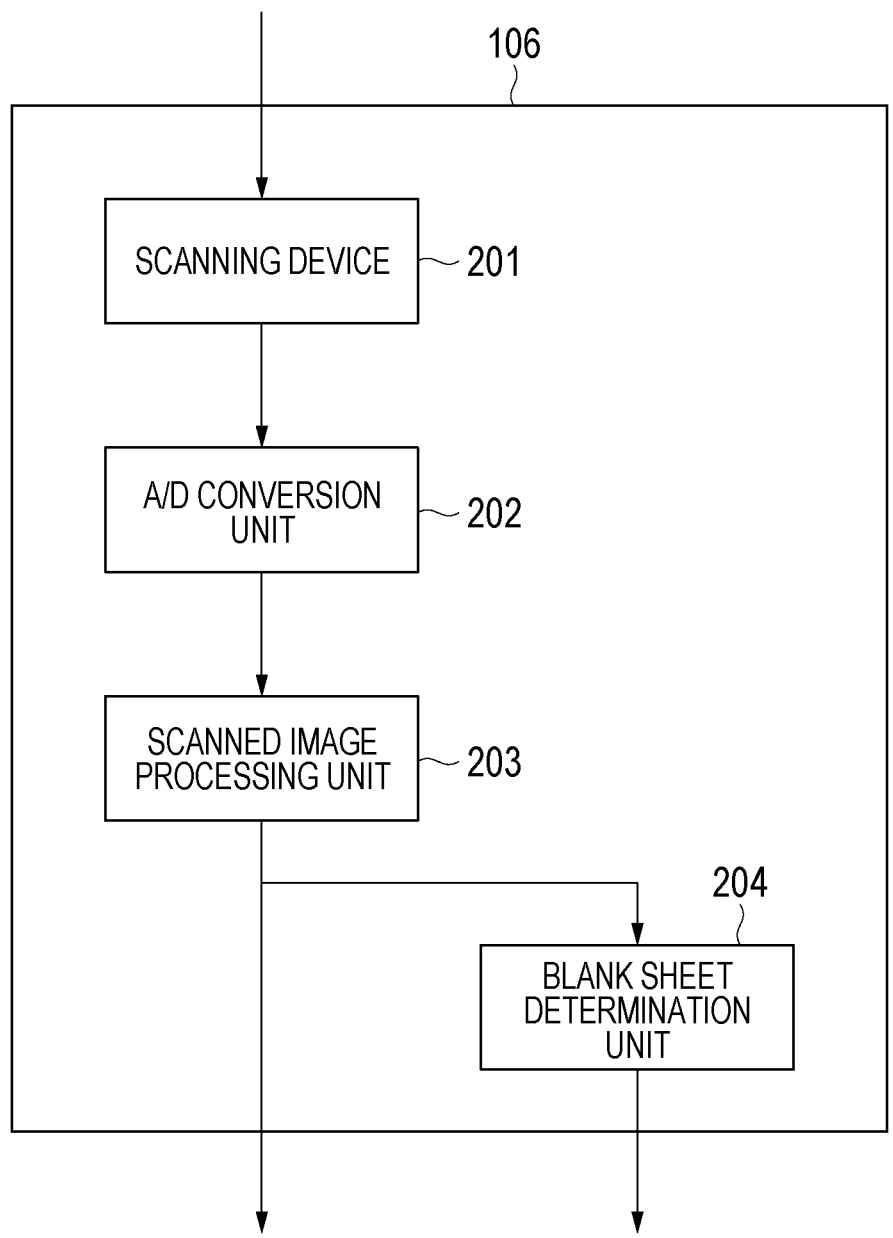
FIG. 2 is a block diagram illustrating an example of the internal configuration of an image input unit.

The configuration of the image input unit 106 will be described with reference to FIG. 2. FIG. 2 is a diagram illustrating the internal configuration of the image input unit 106. A scanning device 201 in FIG. 2 is formed of a CCD, a CMOS, or a CIS. Image data of an original is scanned through the scanning device 201 so that the scanned analog image data is output to a following processing unit. An A/D conversion unit 202 performs analog to digital conversion on the data scanned by the scanning device 201. A scanned image processing unit 203 performs processing such as a shading correction which aligns the level of a highlight area (white) and a dark area (black) of the scanned image data, an MTF (Modulation Transfer Function) correction, and high-frequency suppression processing. A blank sheet determination unit 204 refers to the image data processed by the scanned image processing unit 203 and determines whether the scanned image data is a blank sheet.

<Blank Sheet Determination Method>

A method of determining a blank sheet by the blank sheet determination unit 204 employs a frequency distribution of a brightness value of the image data processed by the scanned image processing unit 203, for example. Based on the image data output by the scanned image processing unit 203, the blank sheet determination unit 204 creates a frequency distribution of the scanned image data acquired by scanning one sheet of the original, and then finds an average value and a variance value from the frequency distribution created. The variance value is calculated in order to use the feature thereof that, when the scanned image data of the original contains meaningful information (information that is not a blank sheet), the calculated variance value takes a large value.

The method of determining a blank sheet uses the frequency distribution in the present embodiment. However, a blank sheet may also be determined by including a processing unit that detects an edge of the scanned image data, counting a pixel that is determined as the edge, and examining the counted value to determine whether the image data is a blank sheet, for example. The blank sheet determination may also be made by combining the frequency distribution, the variance value, and the number of edges.

The blank sheet in this case refers to an original that is determined not to contain printing information (or content). An original on a colored sheet of paper or recycled paper is treated as a blank sheet as well when the original contains no printing information. In other words, the blank sheet determination determines whether any content is printed on the original. Image data acquired by scanning such original and scanned image data containing only show-through are hereinafter referred to as a blank sheet as well. On the other hand, an original containing a small amount of characters or pale characters printed with a halftone dot is not considered a blank sheet. Image data acquired by scanning a sheet of paper containing printing information that is handwritten or printed by a printer is referred to as content data.

In performing the blank sheet determination by such method, one can set a determination criterion (threshold) which is to be used by an image forming apparatus to determine an acquired original as a blank sheet. One can determine in the blank sheet determination using the variance value of the frequency distribution that an original has content when the variance value is larger than a threshold, or is a blank sheet when the variance value is smaller than the threshold. That is, the threshold used in the determination is set higher when one wishes to determine an original as a blank sheet in more cases. On the other hand, the threshold used in the determination is set lower when one wishes to determine the original as the blank sheet in fewer cases. The blank sheet determination unit 204 described below has a configuration where a blank sheet determination level can be set.

The image input unit 106 outputs the image data acquired by processing the scanned original image data by means of the scanned image processing unit 203 as well as the blank sheet determination result by the blank sheet determination unit 204. The blank sheet determination using a plurality of determination levels can be performed in a single scan of the original by the image input unit 106 when the frequency distribution and the variance value calculated from the frequency distribution are used in the blank sheet determination. That is, a plurality of different thresholds of the determination level is applied to the calculated variance to acquire the blank sheet determination result for each threshold. This saves having to scan the same original for a plurality of times for every blank sheet determination level.

Note that the blank sheet determination unit 204 may output only the blank sheet determination result based on the blank sheet determination level that is set by the user of the image forming apparatus used in the present embodiment. Alternatively, the result for all the blank sheet determination levels that can be set in the image forming apparatus used in the present embodiment may be output. In the case where only the result based on the blank sheet determination level set by the user of the image forming apparatus used in the present embodiment is output, the blank sheet determination unit outputs "1" when an original is determined to be a blank sheet and "0" when an original is determined not to be a blank sheet. In a case where three blank sheet determination levels can be set to the image forming apparatus used in the present embodiment, the determination result of the three levels may be output together as "011" or the like in the order from a low blank sheet determination level, that is, in the order from a level that the original is least likely to be determined as a blank sheet. At that time, the determination result may be presented such that one can tell which blank sheet determination level the result is associated with in scanning the original. The following display is provided when the blank sheet determination result is in the order "011" with a preset blank sheet determination level that is set next to the level at which an original is most likely to be determined as a blank sheet (the second determination level from the top), for example. That is, the display is provided in a mode such that a piece of information indicating that "the blank sheet determination level is set to the second level from the top" can be referenced along with the blank sheet result ("1", or the determination that the original is a blank sheet).

The output data and the blank sheet determination result from the image input unit 106 are transferred to the storage unit 108 by the DMAC 111 under control of the control unit 101. The storage unit 108 temporarily saves the image data and the blank sheet determination result transferred through the DMAC 111.

The image processing unit 107 creates a preview image of the acquired image data on the basis of the image data and the blank sheet determination result held in the storage unit 108.

<Operating Unit>

Figure 3:
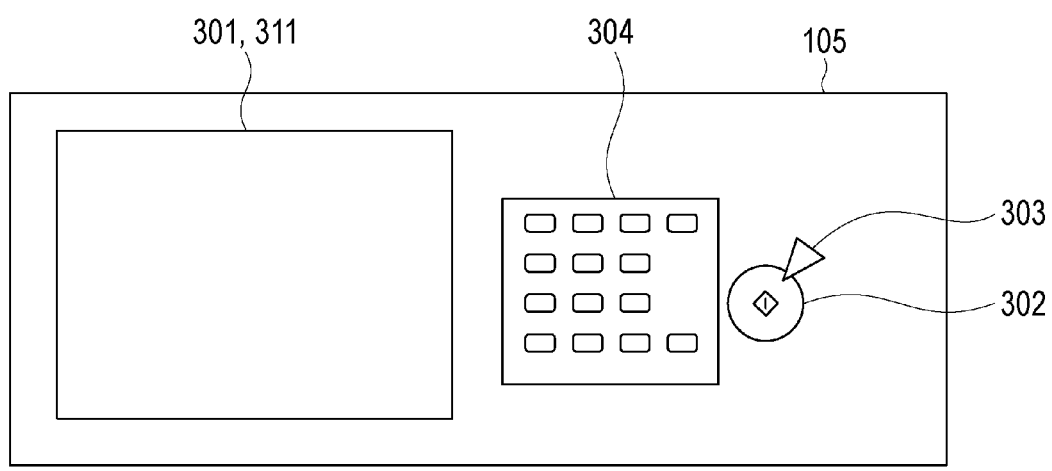
FIG. 3 is a plan view illustrating an example of the configuration of an operating unit.

FIG. 3 is a plan view illustrating another example of the configuration of the operating unit 105 illustrated in FIG. 1. An image display unit 301 in the figure is formed of a liquid crystal panel or an organic EL panel to configure a touch panel display together with a contact detection unit 311 to be described. A start key 302 is used to give an instruction to start scanning the original. A stop key 303 is used to give an instruction to stop an action in operation. A numeric keypad 304 is formed of a group of numeric and character buttons and used to set the number of copies or give an instruction to switch screens on the image display unit 301. The contact detection unit 311 is arranged on the image display unit 301 to detect a state that the touch panel display is touched by a finger or a pen (hereinafter referred to as a touch-on). The contact detection unit 311 notifies the control unit 101 of a detected operation and information on a position coordinate of the finger or the pen touching the touch panel display. The control unit 101 then determines, based on the notified information, what kind of operation is performed on the touch panel display.

<Function Setting Window>

Figure 4A:
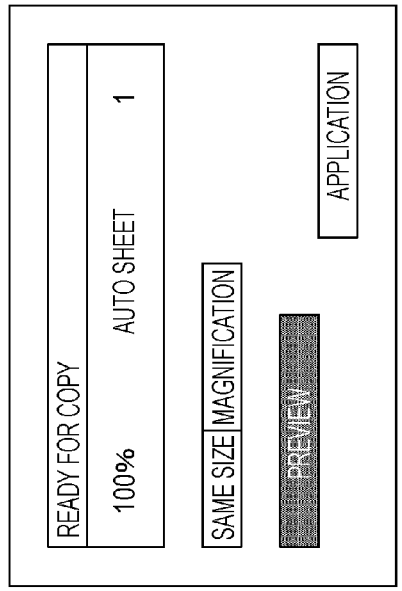
FIGS. 4A to 4D are diagrams, each of which illustrates an example of a function setting window according to the first embodiment.
Figure 4B:
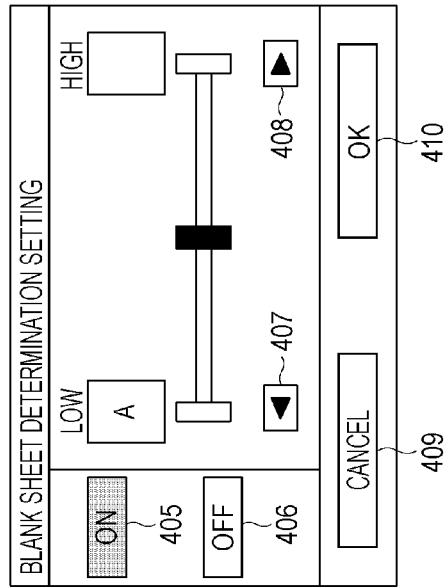
Figure 4C:
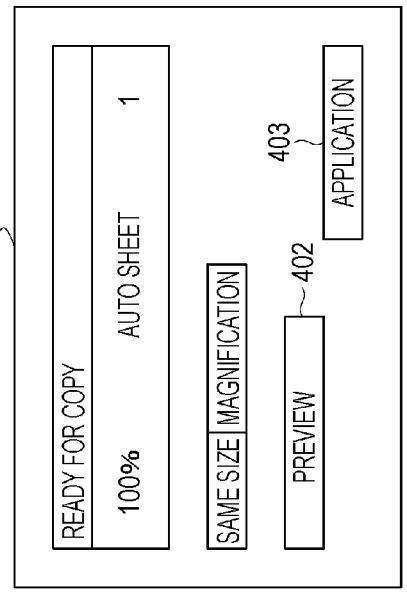

FIGS. 4A to 4D are diagrams, each of which illustrates an example of the display on the image display unit 301 of the present embodiment. FIG. 4A illustrates an initial window 401 on the image display unit 301 displaying a status of the apparatus, magnification setting, preview function setting, and operation mode setting to specify an operation mode other than a copying operation. A setting button 402 in FIG. 4A is pressed when performing ON/OFF setting of a preview function. Upon recognizing that the setting button 402 is pressed, the control unit 101 highlights the setting button as illustrated in FIG. 4B and enables the preview function. A setting button 403 is pressed when specifying an operation of the image forming apparatus used in the present embodiment. Upon recognizing that the setting button 403 is pressed, the control unit 101 switches the display of the image display unit 301 to what is illustrated in FIG. 4C.

Figure 4D:
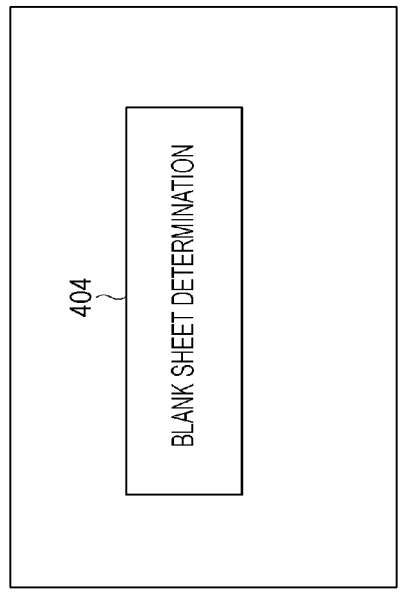

A setting button 404 in FIG. 4C is pressed when performing setting on the blank sheet determination unit 204. The control unit 101 switches the display of the image display unit 301 to FIG. 4D once the setting button 404 is pressed while the image display unit 301 displays a state illustrated in FIG. 4C. The determination level of the blank sheet determination performed by the blank sheet determination unit 204 is set in the window illustrated in FIG. 4D. A button 405 in FIG. 4D is an ON button to enable a blank sheet determination function. The level setting of the blank sheet determination illustrated in the figure is enabled once the ON button 405 is pressed. A button 406 is an OFF button to disable the blank sheet determination function. The level setting of the blank sheet determination illustrated in the figure is disabled once the OFF button 406 is pressed. A setting button 407 is pressed to decrease the determination level of the blank sheet determination, namely, to set to a level at which an original is less likely to be determined as a blank sheet. A setting button 408 is pressed to increase the determination level of the blank sheet determination, namely, to set to a level at which an original is more likely to be determined as a blank sheet. Note that while three levels can be set in the blank sheet determination unit 204 of the present embodiment, five or seven levels may be set as well.

<Preview Window>

Figure 5A:
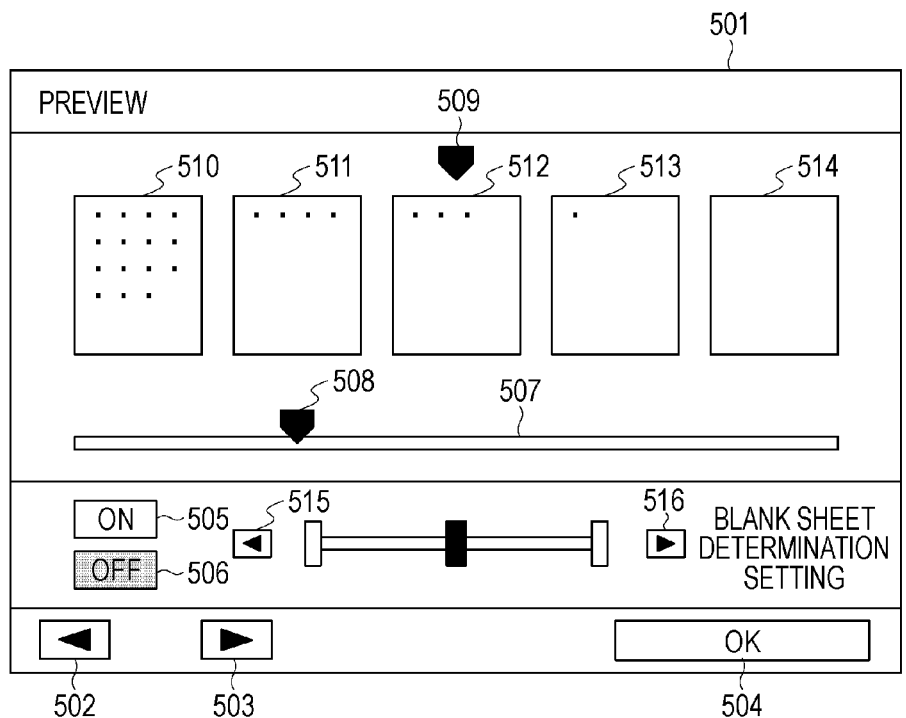
FIGS. 5A and 5B are diagrams, each of which illustrates an example of a preview window according to the first embodiment.
Figure 5B:
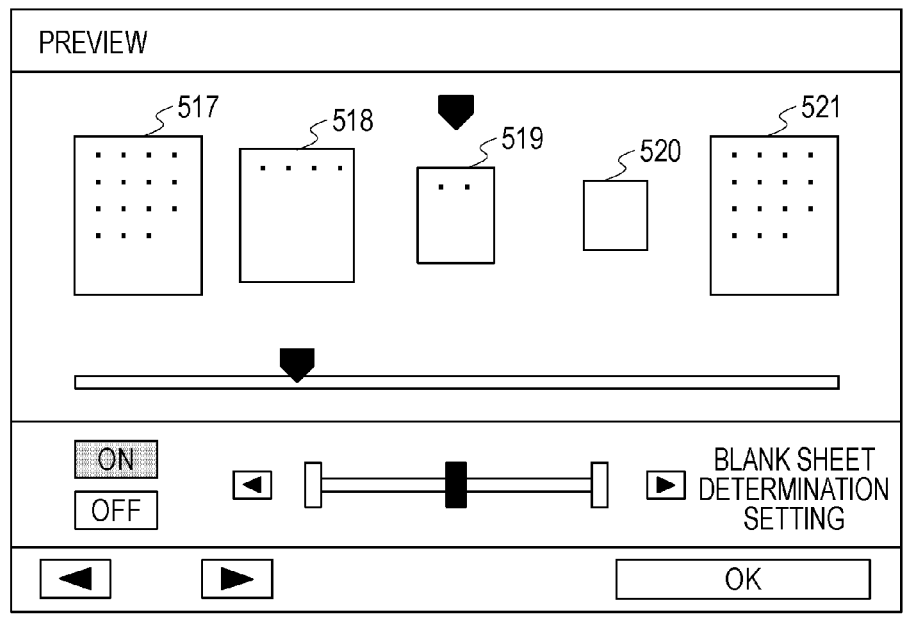

FIGS. 5A and 5B are diagrams, each of which illustrates an example of a preview display window 501 displayed on the image display unit 301 of the present embodiment. FIG. 5A is an example of a preview display where the blank sheet determination function is turned OFF. A button 502 illustrated in FIG. 5A is a back button that is pressed when displaying a previous preview image. A button 503 is a next button that is pressed when displaying a next preview image. A button 504 is an OK button that is pressed to end the preview window. Once the OK button 504 is pressed, the preview window is closed while keeping the setting on the preview window. A button 505 is an ON button that is pressed to enable the blank sheet determination function. The level setting of the blank sheet determination is enabled once the ON button 505 is pressed. A button 506 is an OFF button that is pressed to disable the blank sheet determination function. The level setting of the blank sheet determination is disabled once the OFF button 506 is pressed. A scroll bar 507 indicates where in the whole original the image data with a slider 508 is located. The position of the slider 508 corresponds to the position of an image pointed by a pointer 509.

A button 515 is a setting button to decrease the determination level of the blank sheet determination similar to the setting button 407, while a button 516 is a setting button to increase the determination level similar to the setting button 408. Each of preview images 510 to 514 created is displayed in the preview display window 501.

FIG. 5B illustrates a case where the ON button 505 to enable the blank sheet determination function is pressed in the preview display window 501 illustrated in FIG. 5A. Each of preview images 517 to 521 is an image displayed in the preview when the blank sheet determination function is enabled. Here, the preview images 517 and 521 are the preview images of image data that is determined not to be a blank sheet and are displayed in the same size as in FIG. 5A where the blank sheet determination function is turned OFF. On the other hand, the preview images 518, 519, and 520 are the preview images of image data that is determined to be a blank sheet image and are displayed in a size different from the image data determined not to be a blank sheet.

In the present embodiment, the preview image of the image data more likely to be determined as a blank sheet, namely, the image data with a higher possibility to be determined as a blank sheet, is displayed smaller in the preview. Here, the higher possibility to be determined as a blank sheet means that the image data contains less meaningful information. With the image data having less of the meaningful information, the legibility is not much affected even when the preview image of the image data is displayed smaller. This means that there is less necessity of checking the preview image with less meaningful information, and thus there is no problem even when the image is difficult to see.

When a preview image of image data containing much meaningful information is displayed in a small size, on the other hand, it is difficult to check the information contained in the image data, thereby diminishing the essential meaning of the preview function and degrading the legibility. That is why the preview image of the image data containing much meaningful information, namely the image data less likely to be determined as a blank sheet, is displayed in a large size.

An example of a scanned original, the blank sheet determination result by a plurality of blank sheet determination levels, and a corresponding display mode will be described in detail with reference to FIGS. 6A and 6B.

FIG. 6A illustrates the blank sheet determination result when each of originals (a) to (d) is processed by the blank sheet determination unit 204 as well as the display mode corresponding to each of the plurality of blank sheet determination results. The original (a) containing much printing information is less likely to be determined as a blank sheet, whereby the determination result of all the plurality of blank sheet determination levels equals "0" (not a blank sheet). The original (b) contains less printing information than the original (a) and is thus more likely to be determined as a blank sheet than the original (a). Accordingly, the result is determined to be "1" (a blank sheet) at the blank sheet determination level with a threshold by which an original is most likely to be determined as a blank sheet. The original (c) contains even less printing information than the original (b), and is thus more likely to be determined as a blank sheet than the original (b). Accordingly, the result is determined to be "1" (a blank sheet) at the blank sheet determination level with a threshold by which an original is determined to be a blank sheet with the second highest possibility. The original (d) contains no printing information and is thus most likely to be determined as a blank sheet among the originals (a) to (d). Accordingly, the result is determined to be "1" (a blank sheet) at all the blank sheet determination levels. There will now be described the display mode that changes according to each blank sheet determination result.

First, there will be described a case where the preview image of the image data acquired by scanning each original is displayed while changing a blinking speed in accordance with the possibility that the original is determined to be a blank sheet. In this case, the preview image of the image data more likely to be determined as a blank sheet is displayed with a faster blinking speed. This is because the legibility of the preview image is diminished and so is the essential meaning of the preview function, when the preview image of the image data less likely to be determined as a blank sheet is displayed with a faster blinking speed. On the other hand, the preview image of the image data more likely to be determined as a blank sheet contains less of the meaningful information (information that is not a blank sheet). Accordingly, the legibility of the preview image is not diminished even when the preview image is displayed with an increased blinking speed. Moreover, the preview image of the image data more likely to be determined as a blank sheet is displayed in a blinking manner in order to be able to accentuate where in the whole original the image data is located.

Next, there will be described a case where the preview image of the image data acquired by scanning each original is displayed while changing brightness in accordance with the possibility that the original is determined to be a blank sheet. In this case, the preview image of the image data more likely to be determined as a blank sheet is displayed brighter (with lower density). This is because the legibility of the preview image is diminished and so is the essential meaning of the preview function when displaying the preview image of the image data less likely to be determined as a blank sheet with higher brightness (lower density). On the other hand, the preview image of the image data more likely to be determined as a blank sheet has less of the meaningful information (content). Accordingly, the legibility of the preview image is not diminished even when the preview image is displayed with the higher density (lower density). The display of such bright (less dense) image can also accentuate that the image data contains less of the meaningful information.

As another display mode, there will be described a case where the preview image of the image data acquired by scanning each original is displayed while changing a display position in accordance with the possibility that the original is determined to be a blank sheet. An example of this display mode is illustrated in FIG. 6B.

Here, the preview image of the image more likely to be determined as a blank sheet is displayed at a position that is shifted farther from a normal display position. One can therefore distinguish between the preview image of the image data more likely to be determined as a blank sheet and the preview image of the image data less likely so. Moreover, the preview image of the image data more likely to be determined as a blank sheet can be accentuated that way. Note that in the example illustrated in FIG. 6B, a start position for displaying the preview image of the image data more likely to be determined as a blank sheet is shifted upward in accordance with the plurality of blank sheet determination results. However, the start position for displaying the preview image may be shifted upward or downward.

The display mode can thus be determined in accordance with the possibility that the original is determined to be a blank sheet.

Figure 7:
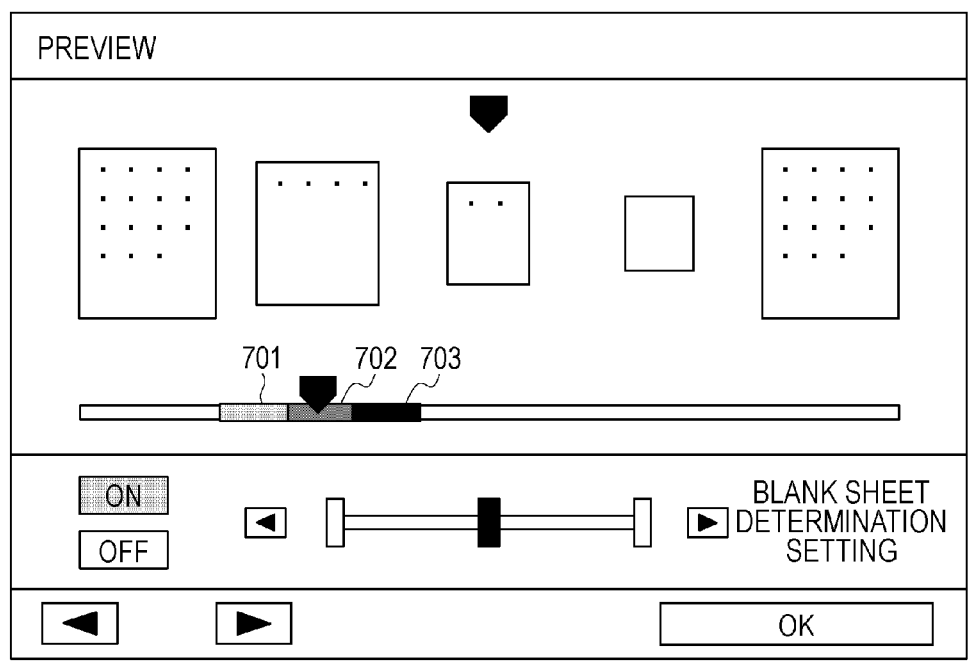
FIG. 7 is a diagram illustrating an example of the preview window according to the first embodiment.

As yet another display mode, FIG. 7 illustrates a case where, on a scroll bar 700, a position corresponding to the preview image of the image data determined to be a blank sheet is displayed with a different color. Here, the preview image of the image data more likely to be determined as a blank sheet is displayed with a darker color as illustrated by reference numeral 703 on the scroll bar 700. One can therefore check where in the whole acquired image data the preview of the image data more likely to be determined as a blank sheet is located without having to move across the whole image for display. This allows a user to easily check where in the plurality of scanned originals an original more likely to be determined as a blank sheet is located.

Note that while the changes in the display size, the blinking speed, the brightness, and the display position are illustrated as an example in the present embodiment, these display modes may also be combined to display the preview image.

The control unit 101 executes a process of deleting an image on the basis of the blank sheet determination level set in FIG. 5 and the blank sheet determination result of each image.

<Control Flow>

Figure 8:
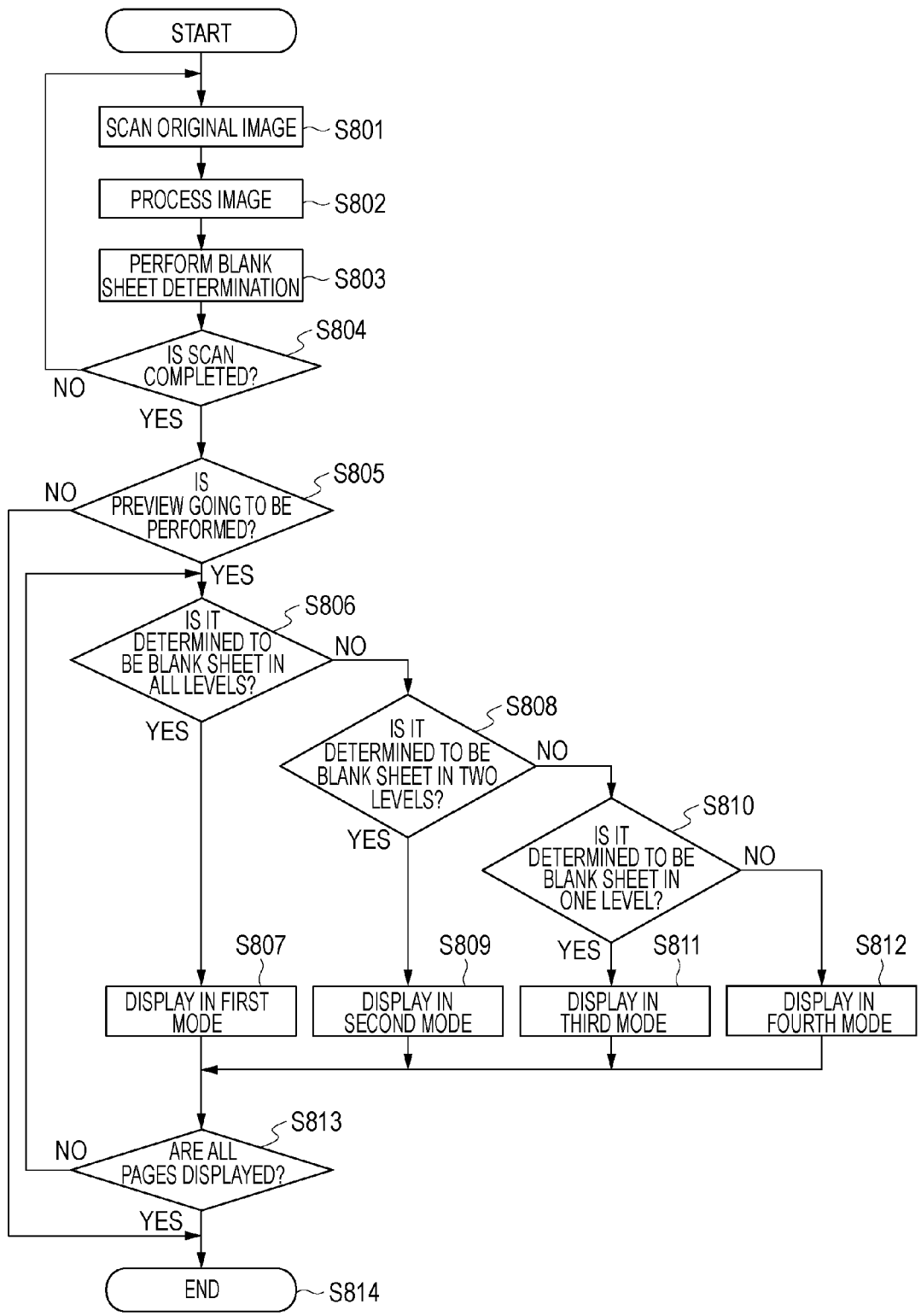
FIG. 8 is a flowchart illustrating the flow of a display control process according to the first embodiment.

FIG. 8 is a flowchart illustrating the flow of processings performed to display on the image display unit 301 of the present embodiment the preview image that is created by the image processing unit 107 and displayed in the preview. This operation is implemented when the control unit 101 extracts a program stored in the ROM 103 to the RAM 104 and executes the program.

In the present embodiment, the preview image is displayed in the display mode corresponding to the blank sheet determination result by the plurality of blank sheet determination levels as described above.

In S801, the scanning device 201 scans an original. In S802, the scanned image processing unit 203 of the image input unit 106 executes various image processings. Then in S803, the blank sheet determination unit 204 of the image input unit 106 determines whether the scanned image data is a blank sheet.

After the blank sheet determination process in S803, it is determined in S804 whether or not the image scan is to be continued. The process returns to S801 when there remains an original to be scanned. The process proceeds to S805 when there remains no original to be scanned.

In S805, it is determined whether to perform a preview. The process ends when it is determined in S805 not to perform the preview. On the other hand, the process proceeds to S806 when it is determined in S805 to perform the preview. The determination on whether or not to perform the preview here is not correlated with the enabling/disabling setting of the blank sheet determination function. The change in the display mode according to the plurality of blank sheet determination results as illustrated in FIG. 6 is not performed even when the preview function is turned ON, unless the blank sheet determination function is enabled, for example. In S806, it is determined whether the image data is determined to be a blank sheet in the blank sheet determination result with all the determination levels. The image data is displayed in a first mode in S807 when the image data is determined to be a blank sheet in all the determination levels, that is, the image data is most likely to be a blank sheet.

When the preview image is to be displayed by changing the blinking speed in accordance with the possibility that the image data is determined to be a blank sheet, the first mode means to display the preview image with the blinking speed faster than any other preview images displayed.

Likewise, when the preview image is to be displayed by changing the brightness (density) in accordance with the possibility that the image data is determined to be a blank sheet, the first mode means to display the preview image more brightly (with lower density) than any other preview images displayed.

Likewise, when the preview image is to be displayed by changing the size in accordance with the possibility that the image data is determined to be a blank sheet, the first mode means to display the preview image in a size smaller than any other preview images displayed.

The process proceeds to S808 when the image data is not determined to be a blank sheet in all the determination levels. In S808, it is determined whether the image data is determined to be a blank sheet in two determination levels out of all the determination levels. The image data is displayed in a second mode in S809 when the image data is determined to be a blank sheet in two of all the determination levels, that is, the image data has the second highest possibility to be a blank sheet.

When the preview image is to be displayed by changing the blinking speed in accordance with the possibility that the image data is determined to be a blank sheet, the second mode means to display the preview image with the second fastest blinking speed among blinking speeds of the preview images displayed.

Likewise, when the preview image is to be displayed by changing the brightness (density) in accordance with the possibility that the image data is determined to be a blank sheet, the second mode means to display the preview image with the second highest brightness (second lowest density) among brightness of the preview images displayed.

Likewise, when the preview image is to be displayed by changing the size in accordance with the possibility that the image data is determined to be a blank sheet, the second mode means to display the preview image in the second smallest size among sizes of the preview images displayed.

The process proceeds to S810 when the image data is not determined to be a blank sheet in two of all the determination levels. In S810, it is determined whether the image data is determined to be a blank sheet in one determination level out of all the determination levels. The image data is displayed in a third mode in S811 when the image data is determined to be a blank sheet in one of all the determination levels, that is, the image data has the third highest possibility to be a blank sheet.

When the preview image is to be displayed by changing the blinking speed in accordance with the possibility that the image data is determined to be a blank sheet, the third mode means to display the preview image with the third fastest blinking speed among the blinking speeds of the preview images displayed.

Likewise, when the preview image is to be displayed by changing the brightness (density) in accordance with the possibility that the image data is determined to be a blank sheet, the third mode means to display the preview image with the third highest brightness (third lowest density) among the brightness of the preview images displayed.

Likewise, when the preview image is to be displayed by changing the size in accordance with the possibility that the image data is determined to be a blank sheet, the third mode means to display the preview image in the third smallest size among the sizes of the preview images displayed.

The image data is displayed in a fourth mode in S812 to thereafter end the process when the image data is not determined to be a blank sheet in one of all the determination levels, that is, the image data has the lowest possibility to be a blank sheet.

When the preview image is to be displayed by changing the blinking speed in accordance with the possibility that the image data is determined to be a blank sheet, the fourth mode means to display the preview image with the fourth fastest blinking speed that is a non-blinking speed among the blinking speeds of the preview images displayed.

Likewise, when the preview image is to be displayed by varying the brightness (density) in accordance with the possibility that the image data is determined to be a blank sheet, the fourth mode means to display the preview image with the fourth highest brightness (fourth lowest density) among the brightness of the preview images displayed.

Likewise, when the preview image is to be displayed by changing the size in accordance with the possibility that the image data is determined to be a blank sheet, the fourth mode means to display the preview image in the fourth smallest size among the sizes of the preview images displayed.

The fourth mode may be the same display mode as when previewing the image data while the blank sheet determination function is not enabled.

The process proceeds to S813 once the preview image of one image data is determined to be displayed in any one of the first to fourth modes. In S813, it is determined whether the display mode of the preview image of all the image data scanned in S801 is determined. The flow ends when the determination in S813 is YES, or returns to S806 when the determination is NO.

As described above, one can easily check which image of the whole image data is determined to be a blank sheet by changing the display mode on the preview window between the preview image of the image data determined to be a blank sheet and the preview image of the image data not determined to be a blank sheet. Moreover, one can easily check in which level each image data is determined to be a blank sheet by changing the display mode according to the blank sheet determination result that is acquired by performing the determination in the plurality of blank sheet determination levels.

(Second Embodiment)

Described in the first embodiment is the method of changing the display mode according to the plurality of blank sheet determination results. There will now be described in a second embodiment a method of changing the blank sheet determination result by changing a display mode of a preview image corresponding to image data selected by a user.

Figure 10:
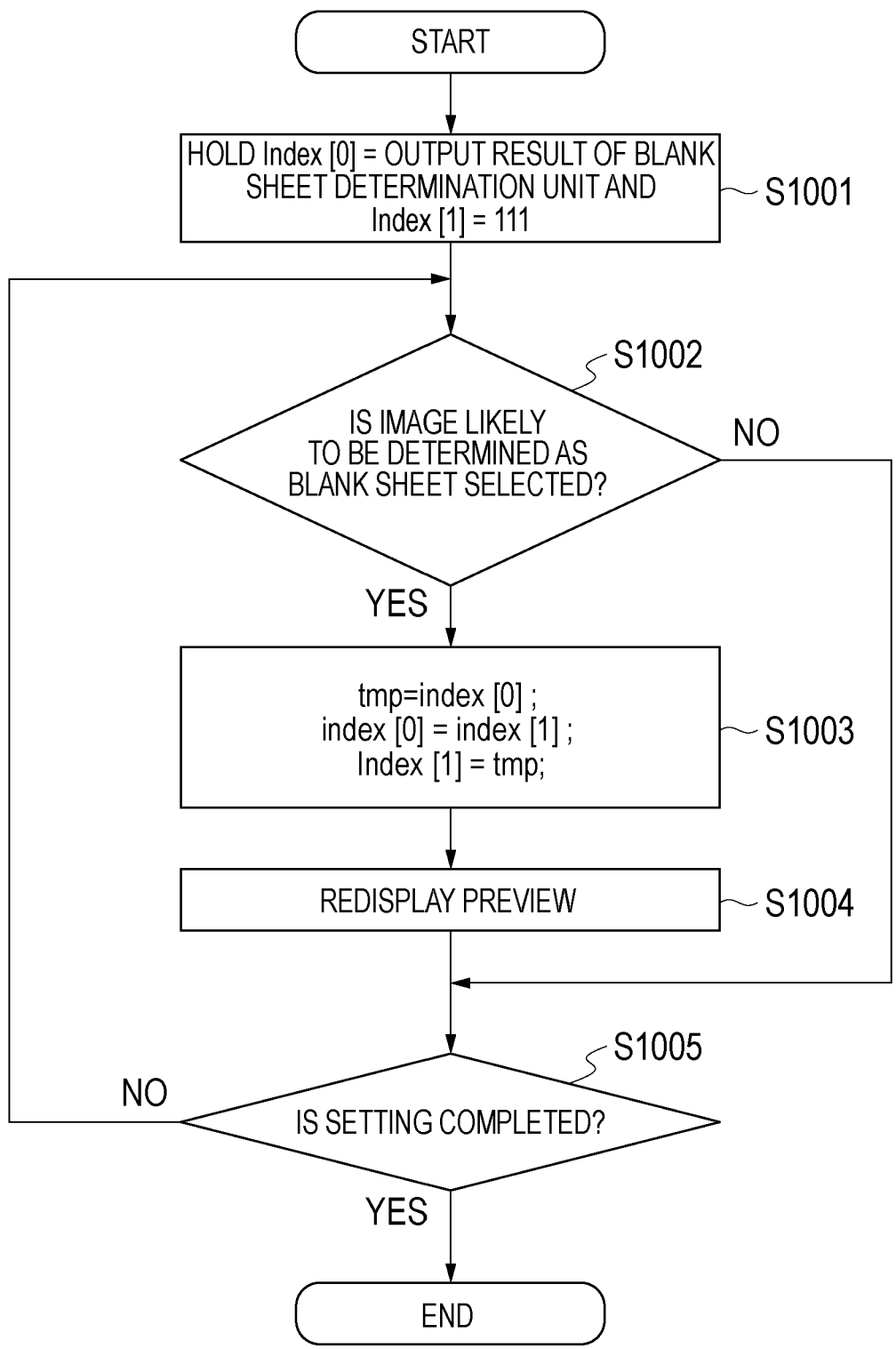
FIG. 10 is a flowchart illustrating the flow of a display control process according to the second embodiment.

FIG. 10 illustrates the flow of processings performed to change the blank sheet determination result in accordance with the display mode changed by the setting of the user in the present embodiment. This operation is implemented when a control unit 101 extracts a program stored in a ROM 103 to a RAM 104 and executes the program.

Figure 9A:
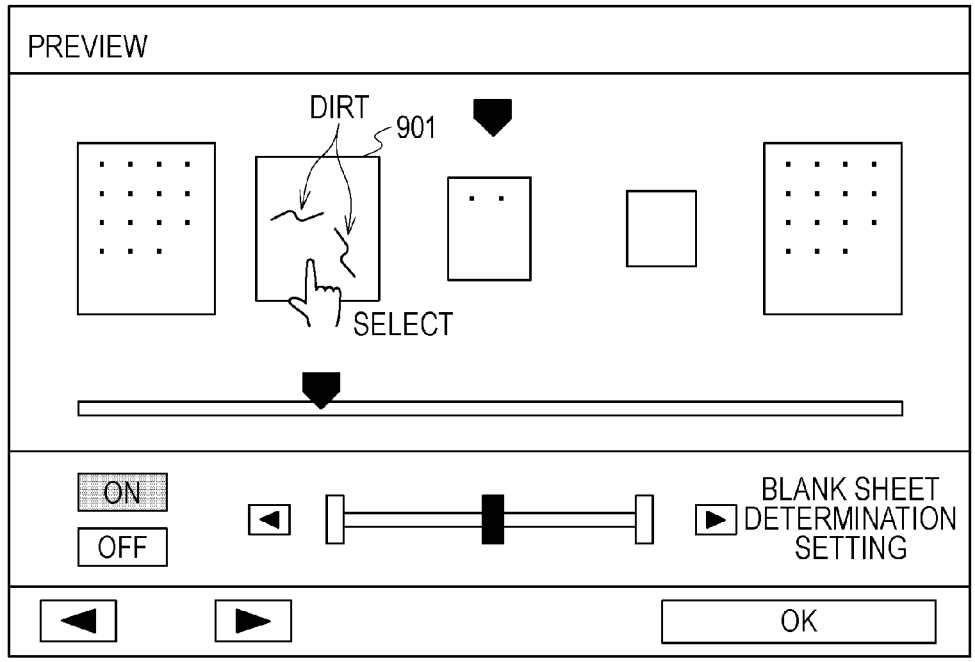
FIGS. 9A and 9B are diagrams, each of which illustrates an example of a preview window when a display mode is changed, according to a second embodiment.

A display size of a preview image selected by the user can be changed when there is applied the display mode in which the display size of the preview image is changed in accordance with the blank sheet determination result as illustrated in FIG. 6A, for example. An example will be described in detail with reference to FIGS. 9A and 9B. FIG. 9A illustrates an example of a preview display in a display mode in which the display size of a preview image is changed in accordance with the level of the possibility that image data is determined to be a blank sheet. A preview image 901 is displayed in a large size in the preview. The preview image 901 originally corresponds to image data acquired by scanning a blank sheet of original, but the image data shows dirt stuck to the original or dust that gets in at the time of scanning. This lowers the possibility that the image data is determined to be a blank sheet because not all blank sheet determinations give "1" as a result in a plurality of blank sheet determination levels. That is, the image data is falsely determined not to be a blank sheet.

When the blank sheet determination level is set to the level at which an original is least likely to be determined as a blank sheet in this state, an original without dust is removed as a blank sheet, whereas an original with dust stuck thereto is less likely to be determined as a blank sheet and is thus determined to be the original containing printing information. This results in outputting image data that is acquired from the original containing no meaningful printing information. In order to avoid such false determination, there will be described in the present embodiment a method in which a user checks a preview image on a display window and corrects the determination result of the preview image corresponding to image data that is to be determined as a blank sheet in the first place.

As illustrated in FIG. 9A, the user checks whether or not there is a preview image of image data that is to be determined as a blank sheet in the image displayed in the preview, and touches a target preview image when finding such preview image of the image data that is to be determined as a blank sheet.

Figure 9B:
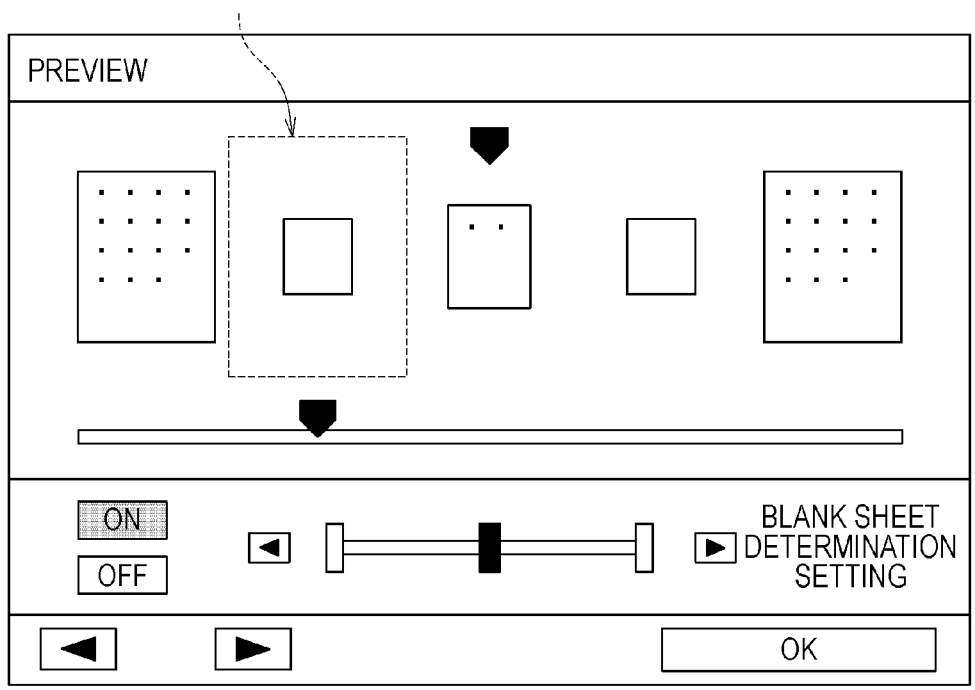

This allows the preview display to be changed as illustrated in FIG. 9B and at the same time the blank sheet determination result to be corrected. As a result, one can obtain a desired blank sheet determination result by a simple operation.

Referring back to FIG. 10, a plurality of blank sheet determination results output by a blank sheet determination unit 204 when scanning the original as well as a value corresponding to the determination that the original is determined to be a blank sheet in all the blank sheet determination results are held in S1001. Here, "index [0]=output result of the blank sheet determination unit" is set to index [1]=111 indicating that the original is more likely to be determined as a blank sheet (more likely contains the printing information). The preview image is created on the basis of the plurality of blank sheet determination results stored in index [0] and to be displayed in the preview display.

In S1002, it is detected whether or not the preview of the image data likely to be determined as a blank sheet is selected by the user. This process is performed by determining whether a contact detection unit 311 detects a touch-on on the preview image of the image data likely to be determined as a blank sheet. The process proceeds to S1003 when the touch-on is detected. The process proceeds to S1005 without redisplaying the preview when the touch-on is not detected, since the preview image is not of the image data that is a blank sheet.

In S1003, the value stored in each of index [0] and index [1] is switched therebetween. In other words, the user can give an instruction to change the result that the original is less likely to be determined as a blank sheet (more likely contains the printing information) to the result that the original is more likely to be determined as a blank sheet (less likely contains the printing information).

In S1004, an image processing unit 107 is used to create a preview image on the basis of the plurality of blank sheet determination results stored in index [0] to perform re-rendering on an image display unit 301. S1005, it is determined whether or not the setting of this flow is completed. This process is performed by determining whether an OK button illustrated in FIGS. 9A and 9B is pressed. The process ends when the OK button is pressed. On the other hand, the process returns to S1002 when the OK button is not pressed.

Accordingly, a simple operation can change the determination result of the original once determined not to be a blank sheet to the result that the original is determined to be a blank sheet, whereby the convenience and operability of the user can be improved.

Other Embodiments

Additional embodiments of the present invention can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-131666, filed Jun. 24, 2013, which is hereby incorporated by reference herein in its entirety.

What is claimed is:

1. An image processing apparatus comprising:
a scanning unit configured to scan in image data;
a determining unit configured to determine whether each of plural pieces of the image data contains specific information according to a plurality of different determination criteria;
an output unit configured to output a plurality of determination results determined by the determining unit based on the plurality of different determination criteria; and
a display control unit configured to display a preview image of the image data based on the plurality of determination results output by the output unit,
wherein, in a case where all of the plurality of determination results output by the output unit indicate that the image data does not contain the specific information, the display control unit displays the preview image of the image data in a first display mode,
wherein, in a case where some of the plurality of determination results output by the output unit indicate that the image data contains the specific information, the display control unit displays the preview image of the image data in a second display mode that is different from the first display mode,
wherein, in a case where all of the plurality of determination results output by the output unit indicate that the image data contains the specific information, the display control unit displays the preview image of the image data in a third display mode that is different from the first and second display modes, and
wherein at least the determining unit, the output unit, and the display control unit, are implemented by a processor.

2. The image processing apparatus according to claim 1, wherein the preview image of the image data is displayed in a smaller size in the first display mode than in the second display mode, and
wherein the preview image of the image data is displayed in a smaller size in the second display mode than in the third display mode.

3. The image processing apparatus according to claim 1, wherein the preview image of the image data is displayed with a faster blinking speed in the first display mode than in the second display mode, and
wherein the preview image of the image data is displayed with a faster blinking speed in the second display mode than in the third display mode.

4. The image processing apparatus according to claim 1, wherein the preview image of the image data is displayed with higher brightness in the first display mode than in the second display mode, and
wherein the preview image of the image data is displayed with higher brightness in the second display mode than in the third display mode.

5. The image processing apparatus according to claim 1, wherein the preview image of the image data is displayed with a lower density in the first display mode than in the second display mode, and
wherein the preview image of the image data is displayed with a lower density in the second display mode than in the third display mode.

6. The image processing apparatus according to claim 1, wherein the preview image of the image data is displayed in the first display mode so that a start position to display the preview image of the image data is changed from that in the second display mode, and
wherein the preview image of the image data is displayed in the second display mode so that a start position to display the preview image of the image data is changed from that in the third display mode.

7. The image processing apparatus according to claim 1, further comprising:
a receiving unit configured to receive an instruction to change a display mode of a preview image selected from preview images displayed by the display control unit; and
a changing unit configured to change an output result by the output unit on image data corresponding to the selected preview image, based on the instruction received by the receiving unit,
wherein at least the receiving unit, and the changing unit, are implemented by a processor.

8. The image processing apparatus according to claim 1, wherein the display control unit is configured to display each of the plurality of preview images displayed on a display in a different display mode.

9. The image processing apparatus according to claim 1, wherein the specific information includes printing information, and the image data is acquired from a blank sheet of an original when the image data is determined not to contain the specific information.

10. A method of controlling an image processing apparatus, the method comprising:
scanning in image data;
determining, at the image processing apparatus, whether each of plural pieces of the image data contains specific information according to a plurality of different determination criteria;
outputting, at the image processing apparatus, a plurality of determination results determined based on the plurality of different determination criteria; and
displaying a preview image of the image data based on the plurality of determination results output by the output unit,
wherein, in a case where all of the plurality of determination results output by the output unit indicate that the image data does not contain the specific information, the preview image of the image data is displayed in a first display mode,
wherein, in a case where some of the plurality of determination results output by the output unit indicate that the image data contains the specific information, the preview image of the image data is displayed in a second display mode that is different from the first display mode, and wherein, in a case where all of the plurality of determination results output by the output unit indicate that the image data contains the specific information, the preview image of the image data is displayed in a third display mode that is different from the first and second display modes.

11. A non-transitory computer-readable storage medium storing computer-executable instructions that cause a computer to execute a control method, the control method comprising:

scanning in image data;

determining, at an image processing apparatus, whether each of plural pieces of the image data contains specific information according to a plurality of different determination criteria;

outputting, at the image processing apparatus, a plurality of determination results determined based on the plurality of different determination criteria; and displaying a preview image of the image data based on the plurality of determination results output by the output unit, wherein, in a case where all of the plurality of determination results output by the output unit indicate that the image data does not contain the specific information, the preview image of the image data is displayed in a first display mode, wherein, in a case where some of the plurality of determination results output by the output unit indicate that the image data contains the specific information, the preview image of the image data is displayed in a second display mode that is different from the first display mode, and wherein, in a case where all of the plurality of determination results output by the output unit indicate that the image data contains the specific information, the preview image of the image data is displayed in a third display mode that is different from the first and second display modes.

* * * * *